United States Patent [19]
Graf

[11] 3,719,873
[45] March 6, 1973

[54] CURRENT LIMITING CONTROL FOR AN ELECTRIC POWER SYSTEM

[75] Inventor: Carlton Eugene Graf, Erie, Pa.

[73] Assignee: General Electric Company, Erie, Pa.

[22] Filed: June 15, 1971

[21] Appl. No.: 153,246

[52] U.S. Cl.................318/227, 317/13 R, 318/476, 321/5, 321/14
[51] Int. Cl. .........................................H02p, H02m
[58] Field of Search ............317/13, 43; 307/127, 93; 321/5, 14, 47; 318/227, 476

[56] References Cited

UNITED STATES PATENTS

| 3,609,507 | 9/1971 | Beck | 321/14 X |
| 3,444,451 | 5/1969 | Schlarbach et al. | 318/227 |
| 2,722,648 | 11/1955 | Dunigan | 317/13 R |
| 3,381,205 | 4/1968 | Howell et al. | 321/5 X |
| 3,619,749 | 11/1971 | Schieman | 318/227 X |

*Primary Examiner*—William H. Beha
*Attorney*—James C. Davis Jr., et al.

[57] ABSTRACT

A power system includes power conversion apparatus for supplying electric power to a load and control apparatus for varying the power output of the power conversion apparatus. A signal representative of an operating parameter such as output current is sensed and utilized to produce a signal only when the operating parameter exceeds a predetermined level, and the signal is utilized in turn by the control apparatus to reduce the level of operating parameter irrespective of independent changes in magnitude and polarity of any and all other input signals to the control apparatus.

6 Claims, 2 Drawing Figures

CURRENT LIMITING CONTROL FOR AN ELECTRIC POWER SYSTEM

BACKGROUND OF THE INVENTION

1. Field of the Invention

This invention relates to electrical systems for supplying electric power to a load such as an a-c or d-c motor and, more particularly, to protection against destructive operating conditions in such electrical systems.

2. Description of the Prior Art

This invention is particularly applicable to the control of variable frequency a-c drive systems of the general type disclosed and claimed by copending patent application Ser. No. 81,758, entitled "Adjustable Speed Polyphase A-C Motor Drive," filed on Oct. 19, 1970, in the names of Carlton E. Graf and Werner K. Volkmann, and by copending patent application Ser. No. 81,757, entitled "Synchronous Time Ratio Control Power Regulator," filed on Oct. 19, 1970, in the name of Carlton E. Graf, both applications being assigned to the assignee of this invention. While the present invention will be described herein in connection with a drive system of the type caught by the aforesaid patent applications to the extent necessary for a full and complete understanding of the invention, a more complete understanding of such inverter circuits may be obtained from the aforesaid patent applications.

Variable speed operation of polyphase a-c motors can be accomplished by providing an adjustable frequency polyphase voltage to such motors. Under such circumstances, the average voltage applied to the motor is advantageously correspondingly varied to provide a substantially constant voltage-to-frequency ratio. The aforesaid patent applications relate to adjustable speed drive systems in which variable voltage polyphase electric power is supplied in this manner to drive a polyphase a-c motor or similar load.

In adjustable speed drive systems of the type disclosed and claimed by the aforesaid patent applications and in electrical drive systems generally, various system components including motors must be protected against destructive overcurrent conditions during motoring and regenerative modes of operation. This correction of a potentially destructive overcurrent condition should occur without regard to any other input signals which may be present. For example, under normal operating conditions, a reference signal supplied by an operator or other command source may call for changes in frequency and voltage which would ordinarily result in an increase in load current. If, however, the current is excessive, the reference signal should be ignored by the drive control and appropriate changes should be made automatically to reduce the current to an acceptable level. Similarly, other operating parameters such as voltage and motor speed should also be maintained within operating ranges and, when they exceed predetermined limits, should be corrected without regard to the polarity and magnitude of any other input signals which may be present.

SUMMARY OF THE INVENTION

Accordingly, it is a primary object of this invention to provide improved means for sensing a selected operating parameter in an electrical drive system and automatically reducing the magnitude of the operating parameter whenever it exceeds a predetermined level.

Another object is to sense a selected operating parameter in an electrical drive system and to automatically reduce the magnitude of the operating parameter whenever it exceeds a predetermined level, the reduction occurring independently of any other control inputs to the drive system.

Yet another object is to sense a selected operating parameter in an electrical drive system and to produce a control signal of substantially fixed magnitude whenever the operating parameter exceeds a predetermined level.

Still another object of this invention is to adjust the power output of the power conversion apparatus of a drive system in response to the aforesaid fixed magnitude control signal at a substantially fixed rate independently of other control inputs to the drive system and independently of the amount by which the sensed operating parameter exceeds the predetermined level.

A further object is to provide means responsive to the output current in an adjustable speed a-c drive system for automatically adjusting the frequency and voltage to reduce the output current whenever the output current exceeds a predetermined level.

Briefly stated, in carrying out the invention in one form, an electrical system for supplying electric power to a load such as an a-c or d-c motor includes means for limiting the magnitude of one or more operating parameters. The limiting means includes means for receiving a signal representative of an operating parameter and for responding thereto to generate an overlimit signal when the magnitude of the operating parameter exceeds a predetermined level. The overlimit signal is supplied to a control signal generator where various input signals are processed to produce a control signal which is then utilized to control the output power supplied to the load. In accordance with the invention, the magnitude and polarity of the overlimit signal are such that it overrides all other input signals to the control signal generator and thereby causes the generation of a control signal which will cause a reduction in the magnitude of the operating parameter.

By a further aspect of the invention, the means for generating the overlimit signal includes switching means having conductive and non-conductive states which assumes a selected one of the states only when the operating parameter, as sensed through a resistive circuit or the like, exceeds a predetermined level. When the switching means is in its selected state, the overlimit signal is produced, and when the switching means is not in its selected state, the overlimit signal is not produced. By a still further aspect of the invention, the limiting means is utilized for limiting the output current supplied to an a-c motor, the limiting means including first and second resistive circuits and corresponding first and second switching means for producing an overcurrent signal of a first polarity when the current during the motoring mode of operation exceeds a predetermined level and an overcurrent signal of a second polarity when the current during the regenerative mode of operation exceeds a predetermined level. In response to an overcurrent signal of the first polarity, the control signal generator produces a control signal for reducing the frequency and voltage of the a-c power supplied to the motor, and in response to an overcurrent signal of the second polarity, the control signal generator produces a control signal for increasing the frequency and voltage of the a-c power supplied by the motor.

BRIEF DESCRIPTION OF THE DRAWINGS

While the novel features of this invention are set forth with particularity in the appended claims, the invention, both as to organization and content, will be better understood and appreciated, along with other objects and features thereof, from the following detailed description taken in conjunction with the drawings, in which:

DETAILED DESCRIPTION

Figure 1:
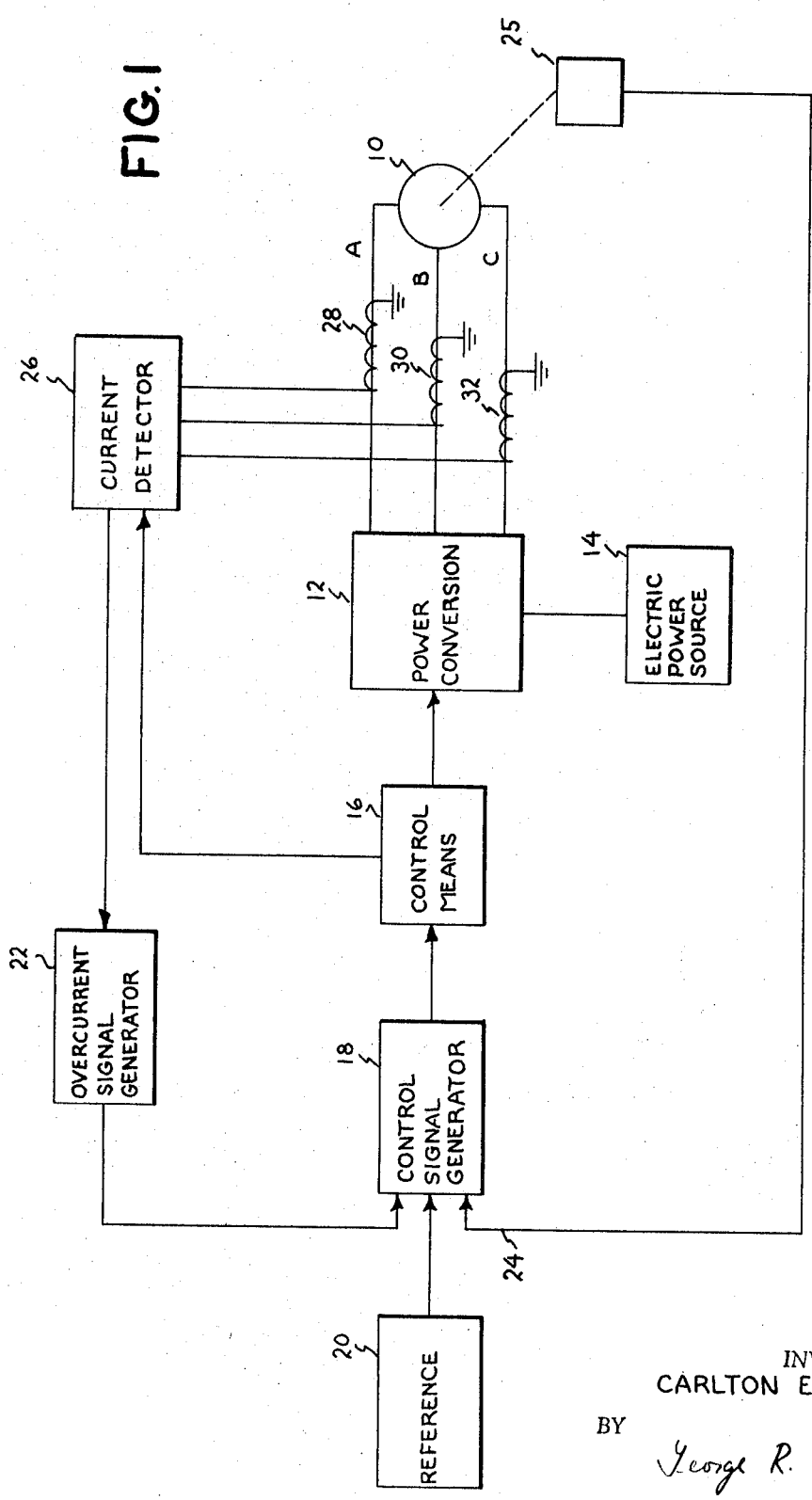
FIG. 1 is a block diagram of an a-c drive system including current limiting means incorporating the invention.

Referring first to FIG. 1, an a-c drive system of the type disclosed by the aforesaid patent applications is illustrated in block diagram form. More particularly, the drive system as illustrated includes a three phase a-c induction motor 10 supplied with variable frequency, variable voltage electric power from power conversion apparatus 12 over phase conductors A, B and C. The power conversion apparatus 12 preferably comprises inverter circuitry for transforming direct current electric power from a d-c source 14 to polyphase variable frequency, variable voltage a-c electric power. As taught by the aforesaid patent applications, the inverter circuitry of the power conversion equipment 12 includes gate controlled rectifying devices such as silicon controlled rectifiers (SCR's) or gaseous thyratrons which conduct in a predetermined sequence and for time periods determined by gate firing pulses supplied to the controlled rectifiers from a control apparatus 16. A clear understanding of the basic principles of operation of the inverter circuitry and its control apparatus 16 may be obtained from the aforesaid patent applications. However, before proceeding to a detailed description of the present invention, it should be noted that overcurrent conditions can occur under many circumstances and in many systems. Accordingly, it will be appreciated as this description proceeds that the current limiting means has much broader application than in the specific a-c drive application illustrated by FIG. 1. Furthermore, the invention may be utilized for preventing other operating parameters, such as voltage and motor speed, from exceeding predetermined limits.

Referring again to the illustrated a-c drive system of FIG. 1, the control apparatus 16 produces firing pulses in the prescribed sequence at a rate determined by the magnitude and polarity of a control signal supplied thereto from a control signal generator 18. The control signal generator 18 produces the control signal in response to various input signals which include a reference signal from a source 20 indicating a desired level of motor operation and, when the current supplied to the motor 10 exceeds a certain acceptable level such as 150 percent of rated current, an overcurrent signal from an overcurrent signal generator 22. In practice, the control signal generator 18 may be supplied with one or more feedback signals such as a speed signal 24 supplied from a motor driven tachometer 25. Signals indicative of various other operating parameters may also be supplied to the control signal generator 18. Assuming that an overcurrent signal is not being supplied from the overcurrent signal generator, the function of the control signal generator 18 is to produce, in response to the reference signal from the source 20 and any feedback signals 24, a control signal which will cause the control means 16 to adjust the frequency and voltage of the output power from the power conversion apparatus 12 such that the actual output is at the level called for by the reference signal. However, when an overcurrent signal is being supplied, the function of the control signal generator 18 is to produce a control signal which will cause the frequency and voltage of the output power to be adjusted such that the current returns to an acceptable level. In other words, the control signal generator operates such that an over-current signal will override any and all other input signals. The manner by which this is accomplished will become clear as this description proceeds.

The overcurrent signal generator 22 is preferably supplied continuously during motor operation with a signal representative of the in-phase current from an in-phase current detector 26, and the overcurrent signal generator 22 produces an overcurrent signal of one polarity when the in-phase current becomes excessive during motoring and an overcurrent signal of the opposite polarity when the 180 degree out-of-phase current becomes excessive during regeneration. The manner by which the overcurrent signals are produced will also become apparent as this description proceeds.

Before turning attention to the overcurrent signal generator 22 and the control signal generator 18 and their construction and operation in accordance with the invention, it should be noted that the basic function of the overcurrent signal generator 22 is to produce an overcurrent signal in response to an input signal indicative of current exceeding a prescribed level. While, for the reasons discussed above, it is desirable that the in-phase current be sensed, it will be obvious to those skilled in the art that it might under certain circumstances be acceptable to merely monitor actual current. For a fuller understanding of a preferred embodiment of the in-phase current detector 26, attention is directed to copending patent application Ser. No. 147,771 for "Adjustable Speed Polyphase A-C Motor Drive Utilizing An In-Phase Current Signal For Motor Control," filed on May 28, 1971, in the names of C. E. Graf, Einer A. Skogsholm, and Werner K. Volkmann, and assigned to the assignee of this invention. As fully explained therein, the in-phase current detector 26 is supplied from the control means 16 with signals in phase with the motor phase voltages and from current transformers 28, 30, and 32 with signals proportional to and in phase with the actual phase currents. The in-phase current detector 26 responds to these input signals to produce a composite output signal which is proportional to the sum of the in-phase current components. It is particularly desirable in a-c drive systems to sense the in-phase components of current since the in-phase components have one polarity during the motoring mode of operation and the opposite polarity during the regenerative mode of operation.

Figure 2:
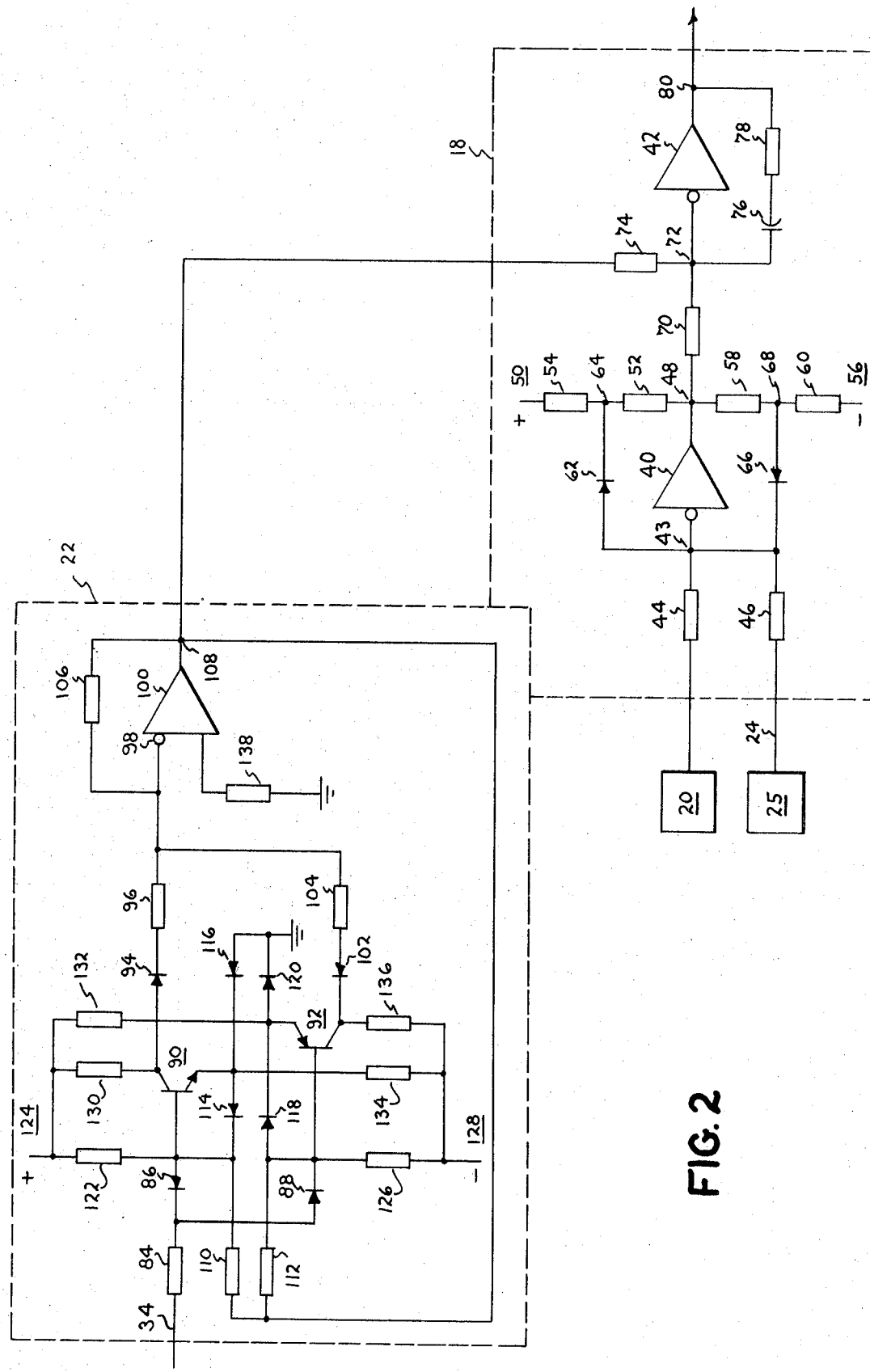
FIG. 2 is a circuit diagram of the overcurrent signal generating means and the control signal generating means of FIG. 1.

Referring now to FIG. 2, the control signal generator 18 and the overcurrent signal generator 22 will be described in detail. The control signal generator 18 comprises a first amplification stage including an inverting operational amplifier 40 and a second amplification and integration stage including an inverting operational amplifier 42. The input 43 of the amplifier 40 is coupled to the reference source 20 through an input resistor 44 and to a feedback source such as a tachometer 25 through an input resistor 46. The output 48 of the amplifier 40 is connected to a source of fixed positive potential at 50 through a pair of resistors 52 and 54 and to a source of fixed negative potential at 56 through a pair of resistors 58 and 60, the resistors 52 and 58 being connected to the output 48 of the amplifier 40. A diode 62 is connected between the input 43 of the amplifier 40 and the junction 64 between the resistors 52 and 54, the anode of the diode 67 being connected to the input 43. An oppositely poled diode 66 is connected between the input 43 and the junction 68 between the resistors 58 and 60. The output 48 of the amplifier 40 is also coupled through an output resistor 70 to the input 72 of the amplifier 42, the input 72 also being connected to receive overcurrent signals from the overcurrent signal generator 22 through a resistor 74. A stabilizing circuit including a capacitor 76 and a resistor 78 connected in series is connected between the input 72 and the output 80 of the amplifier 42. The output 80 is also coupled to the control means 16 for supplying a control signal thereto.

The overcurrent signal generator 22 receives on conductor 34 a signal indicative of the magnitude and polarity of motor current, preferably a composite signal indicative of the in-phase components of current as taught above. The signal on conductor 34 is supplied through an input resistance 84 and diodes 86 and 88 to the bases of transistors 90 and 92, respectively. More particularly, transistor 90 is of the NPN type and has its base connected to the anode of the diode 86 while transistor 92 is of the PNP type and has its base connected to the cathode of the diode 88. The collector of the transistor 90 is connected through a diode 94 and a resistor 96 to the inverting input 98 of an amplifier 100, the anode of the diode 94 being connected to the transistor 90. Similarly, the collector of the transistor 92 is connected through a diode 102 and a resistor 104 to the inverting input 98, the cathode of the diode 102 being connected to the transistor 92. A gain-setting resistor 106 preferably equal in magnitude to the resistors 96 and 104 is connected between the input 98 and the output 108 of the amplifier 100. The output terminal 108 of the amplifier 100 is connected to the resistor 74 of the control signal generator 18 for supplying overcurrent signals thereto, and to output feedback resistors 110 and 112. Resistor 110 is connected to the base of transistor 90 and to ground or common through diodes 114 and 116, the emitter of the transistor 90 being connected to the anode of diode 114 and the cathode of diode 116, and the anode of diode 116 being connected to ground. Resistor 112 is connected to the base of the transistor 92 and to ground or common through diodes 118 and 120, the emitter of the transistor 92 being connected to the cathode of diode 118 and the anode of diode 120, and the cathode of diode 120 being connected to the ground. A base bias resistor 122 is connected between the base of transistor 90 and a source 124 of fixed positive potential, and a base bias resistor 126 is connected between the base of transistor 92 and a source 128 of fixed negative potential. Current limiting resistors 130 and 132 are connected between the positive voltage source 124 and, respectively, the collector of transistor 90 and the emitter of transistor 92. Similarly, current limiting resistors 134 and 136 are connected between the negative voltage source 128 and, respectively, the emitter of transistor 90 and the collector of transistor 92. The amplifier 100 is connected to common or ground by resistor 138.

The operation of the overcurrent signal generator 22 will now be described, the function of the generator 22 being to produce an overcurrent signal of fixed negative magnitude at the output terminal 108 of the amplifier 100 whenever a negative signal of a predetermined magnitude or larger is present at the input 34 and to produce an overcurrent signal of fixed positive magnitude at the output terminal 108 whenever a positive signal of a predetermined magnitude or larger is present at the input 34. Whenever the signal at 34 is within the range between the predetermined positive and negative levels, there will be a zero level signal at the output terminal 108. Thus, if a signal having the predetermined positive magnitude or larger at 34 represents an overcurrent condition during motoring operation and if a signal having the predetermined negative magnitude or larger at 34 represents an overcurrent condition during regenerative operation, it will be appreciated that the generator 22 comprises a snap action switching device which produces a fixed output signal of appropriate magnitude whenever an overcurrent condition is encountered, but which does not produce an output signal whenever the motor current is within acceptable limits.

Assuming now that the motor 10 is not operating and that there accordingly is a zero level signal at 34, transistor 90 will be biased "on" by the source 124 and the resistor 122 and the transistor 92 will be biased "on" by the source 128 and the resistor 126. Under these conditions and through proper selection of the values of resistors 130, 132, 134 and 136, the collector of the transistor 90 will be held at a negative level and the collector of the transistor 92 will be held at a positive level. Due to the poling of the diodes 94 and 102, current flow from the collectors of the transistors 90 and 92 to input 98 of the amplifier 100 will be blocked, and there will therefore be no output signal at the output 108.

Assuming now that the motor is operating under motoring conditions, the signal at 34 will have a positive magnitude and will therefore buck the bias voltage provided at the base of the transistor 92 by the source 128 and the resistor 126. These elements are selected such that the transistor 92 remains "on" until the signal at 34 reaches the preselected overcurrent level, at which condition the bias voltage is overcome by the positive input signal at 34 so as to turn "off" the transistor 92. When this occurs, the voltage at the collector of the transistor 92 will drop to a negative level and will remain at this fixed level until the transistor 92 is turned "on" again. Due to the negative voltage at the collector of the transistor 92 and the polarity of the diode 102, a negative current is impressed at the inverting input 98 of the amplifier 100, and a positive overcurrent signal is consequently produced at the output terminal 108 and supplied to the control signal generator 18 as an overcurrent signal. This positive signal at the output 108 is also supplied through the resistor 112 to further increase the positive turn off signal at the base of the transistor 92. Accordingly, the transistor 92 will not turn "on" again until the actual current signal at 34 drops to a level somewhat below the preselected overcurrent level. This feedback through the resistor 112 thus provides a hysteresis effect.

During regenerative operation of the motor 10, the current signal at 34 will have a negative magnitude which will buck the positive bias on the base of the transistor 90. At a preselected regenerative overcurrent level, the negative input signal at 34 will be sufficient to overcome the positive base bias and thereby turn off the transistor 90. When this occurs, the voltage at the collector of the transistor will rise to a fixed positive level, thus impressing a positive voltage at the input 98 of the amplifier 100. Consequently, a negative overcurrent signal of a fixed magnitude is produced at the amplifier output 108 and supplied to the control signal generator 18. A feedback network including resistor 110 between the amplifier output 108 and the base of the transistor 90 assures that the regenerative current will drop significantly before the transistor 90 is turned "on" again.

With it now understood that the overcurrent signal generator 22 produces a positive overcurrent signal of fixed magnitude whenever the motoring current (or composite signal indicative of the in-phase components of current) exceeds a predetermined level, a negative overcurrent signal of fixed magnitude when the regenerative current exceeds a predetermined level, and no signal or a substantially zero signal whenever the motor current is within acceptable limits, the operation of the control signal generator 18 will become clear. During motor operation, the reference signal from the reference source 20 and the feedback signal at 24 are supplied through the input resistors 44 and 46, respectively, to the input 43 of the amplifier 40, which produces at its output 48 a preliminary control signal which is supplied to the resistor 70. Clamping circuits comprising the diodes 62 and 66 and the resistors 52, 54, 58 and 60 in combination with the d-c sources 50 and 56 limit the magnitude of the positive and negative signals which are produced by the first amplification stage. During motor operation within acceptable current limits, the preliminary control signal supplied through resistor 70 to the input 72 of the amplifier 42 is the only input supplied to the second amplification stage since the overcurrent signal generator 22 is not producing an overcurrent signal. Under such conditions, the signal supplied by the first amplification stage is amplified by the second amplification stage and supplied to the control means 16 as a variable control signal.

However, the maximum positive and negative signal levels at the output 48 of the amplifier 40 and the fixed positive and negative signal levels at the output 108 of the amplifier 100 and the values of the resistors 70 and 74 are selected such that an overcurrent signal supplied through the resistor 74 to the amplifier input 72 will always be sufficient to overcome the maximum signal supplied through the resistor 70 from amplifier 40. Thus, if a preliminary control signal calling for increased motor speed and current is being produced by the first amplification stage at the maximum possible negative voltage at output 48, a positive overcurrent signal at output 108 of amplifier 100 will have sufficient magnitude to overcome the negative preliminary control signal from amplifier 40 to produce a control signal at the output 80 of amplifier 42 calling for a reduction in speed and current. Similarly, a negative overcurrent signal at output 108 will result in a reduction in regenerating current by overcoming the positive control signal being supplied by amplifier 40.

From the foregoing description, it will be appreciated that so long as the motor current as indicated by its in-phase components is within acceptable limits, the overcurrent signal generator 22 does not produce a signal at its output 108. However, when the current reaches a predetermined level, the generator 22 functions as a snap action device in that the signal at output 108 jumps from the zero level to either the fixed positive level or the fixed negative level depending upon the polarity of the current signal supplied on conductor 34. The amplification and integration stage of the control signal generator, this stage including the inverting operational amplifier 42 and the capacitor 76 and resistor 78, responds to the step change supplied to the input 72 to change the control signal at output 80 in the direction to reduce the overcurrent condition. The various circuit elements are selected such that a step change in the signal at point 72 resulting from the application or removal of an overcurrent signal or a rapid change in the output of the first amplification stage will result in a rapid, but controlled, rate of change in the control signal produced at the amplifier output 80. Specifically, the various circuit elements are selected such that neither the maximum control signal levels at output 80 nor its rate of change in response to rapid changes in signal level at input 72 will exceed the response and capacity capabilities of the power conversion equipment 12 and the load 10.

From the foregoing, it will be obvious to those skilled in the art that the values of the various elements comprising the circuitry illustrated by FIG. 2 must be selected properly in order to provide operation as just described. A suitable embodiment of the invention would include a power supply providing +20 volts at terminals 50 and 124 and −20 volts at terminals 56 and 128. The remaining elements would have the following characteristics or identification: amplifiers 40, 42 and 100 — 741 type; transistor 90 — JEDEC No. 2N4424; transistor 92 — JEDEC No. 2N5366; diodes 62, 66, 86, 88, 94, 102, 114, 116, 118 and 120 — JEDEC No. 1N4148; resistors 54, 60 — 15 K ohms; resistors 52, 58, 130, 136, 96, 104, 106 — 10 K ohms; resistor 70 — 470 K; resistor 74 — 150 K; resistors 122 and 126 — 22 K ohms; resistors 132 and 134 — 3.3 K ohms; resistors 78, 138 — 4.7 K; resistor 84 — 1 K ohms; resistors 110 and 112 — 470 K ohms; and capacitor 76 — 2.0 microfarads. In the event that another power supply is used or if it is desired that different operating levels or rates of change be used, appropriate changes in the elements would be made.

Although this invention has been described in connection with a preferred embodiment, it will occur to those skilled in the art that many modifications and variations are possible without departing from the spirit and scope of the invention. For example, various signal polarities have been assumed for motoring and regenerative operation. These could be reversed, if desired. Furthermore, although the overcurrent signal generator 22 is preferably a snap-acting switching device as described, it will occur to those skilled in the art that where less-precise control is required, it could be modified to provide a ramp-type action when the current reaches an overcurrent condition.

Furthermore, while the invention has been described here in connection with overcurrent limiting means in an a-c drive system, it will be appreciated that the invention may be utilized advantageously in the control of other operating parameters not only in a-c drive systems, but also in d-c drive systems and other electrical systems. For example, a motor speed signal could be supplied to an overspeed signal generator similar in design and function to the overcurrent signal generator 22 such that an overspeed signal is generated whenever the motor speed exceeds a predetermined level. It will also occur to those skilled in the art that several overlimit generators could be connected to a control signal generator such that an excessive change in any one of several operating parameters will result in an appropriate change in the control signal produced by the control signal generator. Accordingly, it is intended that these and other modifications of the invention be included within the scope of the invention.

What is claimed as new and is desired to secure by Letters Patent of the United States is:

1. In an electrical system including power conversion means for supplying electric power to a load, and means operative during the delivery of electric power to the load for developing an electrical signal representative of a selected system operating parameter; control means comprising:
   at least one overlimit signal producing means having an input coupled to receive the signal representative of the operating parameter and being responsive thereto to produce an overlimit signal only when the operating parameter exceeds a predetermined level, the overlimit signal having a fixed magnitude independent of the amount by which the operating parameter exceeds the predetermined level,
   first circuit means responsive to input signals including a reference signal for producing a corrected reference signal, said first circuit means including means for preventing the magnitude of the corrected reference signal from exceeding a predetermined maximum level substantially less than the fixed magnitude of an overlimit signal produced by said overlimit signal producing means,
   second circuit means coupled to said first circuit means and said overlimit signal producing means for receiving corrected reference and overlimit signals therefrom and being responsive to signals supplied thereto to produce a control signal, said second circuit means including integrating means for limiting the maximum rate of change of the control signal in response to abrupt changes in the level of the signals supplied thereto by said first circuit means and said overlimit signal producing means,
   and means coupled to said second circuit means for receiving the control signal therefrom and varying the electric power output of the power conversion means in response to variations in the control signal,
   the polarity and fixed magnitude of the overlimit signal being such that said second circuit means produces in response thereto a control signal for adjusting the power output of the power conversion means such that the level of the operating parameter is reduced irrespective of independent changes in magnitude and polarity of any and all other input signals including the reference signal to said first circuit means.

2. In an electrical system including power conversion means for supplying electric power to a load, control means responsive to input signals for varying the power output of the power conversion means, and means operative during the delivery of electric power from the power conversion means to the load for developing an electrical signal representative of a selected system operating parameter; means for limiting the level of the selected operating parameter comprising:
   signal input means for receiving the signal representative of the selected operating parameter,
   voltage input means including a first voltage input for connection to a voltage source of negative polarity and a second voltage input for connection to a voltage source of positive polarity,
   circuit means including a first resistive circuit interconnecting said signal input means and said first voltage input and a second resistive circuit interconnecting said signal input means and said second voltage input,
   overlimit signal producing means including first and second switching means each having conductive and non-conductive states, said first switching means being connected to a predetermined point in said first resistive circuit and assuming a selected one of its states when the potential at said predetermined point in said first resistive circuit exceeds a level corresponding to a predetermined operating parameter level of a first polarity and said second switching means being connected to a predetermined point in said second resistive circuit and assuming a selected one of its states when the potential at said predetermined point in said second resistive circuit exceeds a level corresponding to a predetermined operating parameter level of a second polarity,
   and means coupling said overlimit signal producing means to the control means for supplying the overlimit signal to the control means as an input signal,
   the polarity and magnitude of the overlimit signal being such that said control means adjusts the power output of the power conversion means in response thereto to reduce the level of the selected operating parameter.

3. Limiting means as defined by claim 2 in which each of said first and second switching means is a transistor having its base connected to the predetermined point of the respective one of said resistive circuits.

4. An a-c adjustable speed drive system comprising:
   a polyphase a-c motor;

power conversion means for changing unidirectional electric power to polyphase electric power, said conversion means including a plurality of output phases each connected to a respective phase of said motor;

control means responsive to input signals including a reference signal for controlling the power output of said power conversion means;

means operative during the delivery of polyphase electric power to said motor by said power conversion means to generate a signal proportional to the output current of said power conversion means which is in phase with the output voltage;

and current limiting means comprising:

signal input means coupled to said in-phase signal generating means for receiving the in-phase signal therefrom, voltage input means including a first voltage input for connection to a voltage source of negative potential and a second voltage input for connection to a voltage source of positive potential, circuit means including a first resistive circuit interconnecting said signal input means and said first voltage input and a second resistive circuit interconnecting said signal input means and said second voltage input, overcurrent signal producing means including first and second switching means each having conductive and non-conductive states, said first switching means being connected to a predetermined point in said first resistive circuit and assuming a selected one of its states only when the in-phase current signal is of positive polarity and exceeds a predetermined level, and said second switching means being connected to a predetermined point in said second resistive circuit and assuming a selected one of its states only when the in-phase current signal is of negative polarity and exceeds a predetermined level, said overcurrent signal producing means producing an overcurrent signal of a first polarity when its first switching means assumes its selected state and an overcurrent signal of a second polarity when its switching means assumes its selected state, and means coupling said overcurrent signal producing means to said control means for supplying the overcurrent signal to said control means as an input signal, the polarity and magnitude of the overcurrent signal being such that said control means adjusts the frequency of the a-c power output of said power conversion means in response thereto to reduce the level of in-phase output current.

5. A drive system as defined by claim 4 in which each of said first and second switching means is a transistor having its base connected to the predetermined point of the respective one of said first and second resistive circuits.

6. An a-c adjustable speed drive system comprising:

a polyphase a-c motor;

power conversion means for changing unidirectional electric power to polyphase electric power, said conversion means including a plurality of output phases each connected to a respective phase of said motor;

means operative during the delivery of polyphase electric power to said motor by said power conversion means to generate a signal proportional to the output current of said power conversion means which is in phase with the output voltage;

signal input means coupled to said in-phase signal generating means for receiving the in-phase signal therefrom, voltage input means for connection to at least one source of fixed electric potential, first circuit means interconnecting said signal input means and said voltage input means, overcurrent signal producing means responsive to the potential at least one predetermined point in said first circuit means for producing an overcurrent signal only when the in-phase output current exceeds a predetermined level, the overcurrent signal having a fixed magnitude independent of the amount by which the output current exceeds the predetermined level, second circuit means responsive to input signals including a reference signal for producing a corrected reference signal, said second circuit means including means for preventing the magnitude of the corrected reference signal from exceeding a predetermined maximum level substantially less than the fixed magnitude of an overcurrent signal produced by said overcurrent signal producing means, third circuit means coupled to said second circuit means and said overcurrent signal producing means for receiving corrected reference and overcurrent signals therefrom and being responsive to signals supplied thereto to produce a control signal, said third circuit means including integrating means for limiting the maximum rate of change of the control signal in response to abrupt changes in the level of the signals supplied thereto by said second circuit means and said overcurrent signal producing means, and control means coupled to said third circuit means for receiving the control signal therefrom and varying the frequency of the electric power output of the power conversion means in response to variations in the control signal, the polarity and fixed magnitude of the overcurrent signal being such that said third circuit means produces in response thereto a control signal for adjusting the frequency of the electric power output of the power conversion means such that the level of the in-phase output current is reduced.

* * * * *